United States Patent [19]

Eaker

[11] Patent Number: 5,785,455
[45] Date of Patent: Jul. 28, 1998

[54] SHORE SEAL TIDAL BARRIER CONTAINMENT BOOM

[75] Inventor: Andrew B. Eaker, Kennesaw, Ga.

[73] Assignee: Engineered Fabrics Corporation, Rockmart, Ga.

[21] Appl. No.: 713,146

[22] Filed: Sep. 12, 1996

[51] Int. Cl.$^6$ .................. C02F 1/24; E02B 15/06
[52] U.S. Cl. .................. 405/63; 210/242.1; 210/922; 405/68; 405/70
[58] Field of Search .................. 405/23, 26, 63, 405/64, 68, 70; 210/242.1, 922, 923, 924

[56] References Cited

U.S. PATENT DOCUMENTS

| | | | |
|---|---|---|---|
| 4,140,424 | 2/1979 | Bretherick et al. | 405/26 X |
| 5,238,327 | 8/1993 | Blair et al. | 405/68 |

*Primary Examiner*—Tamara L. Graysay
*Assistant Examiner*—Tara L. Mayo
*Attorney, Agent, or Firm*—Renner, Kenner, Greive, Bobak, Taylor & Weber

[57] ABSTRACT

A shore seal boom having a buoyancy chamber and a ballast chamber is employed to contain hazardous material within a confined area. An end connector bar is employed to connect the ends of the buoyancy chamber and the ballast chamber, wherein the ballast chamber includes a tapered bottom surface so that the end connector bar is maintained in a substantially perpendicular relationship with the shore or other support surface upon which the shore seal boom is maintained. The perpendicular relationship of the end connector bar facilitates the attachment to other short seal booms and maintains a sealed connection between the boom and the ground surface.

15 Claims, 3 Drawing Sheets

SHORE SEAL TIDAL BARRIER CONTAINMENT BOOM

TECHNICAL FIELD

The invention herein resides generally in the art of containment booms for enclosing fluids, spilled hazardous materials and the like in a specified area. More particularly, the present invention relates to a shortened section of a containment boom for containing spilled material that is located on a shore and adjacent body of water. Specifically, the present invention relates to a containment boom which has opposed ends that are terminated by end connector bars and wherein each end connector bar remains substantially perpendicular when the boom is expanded.

BACKGROUND ART

Whenever oil or other environmentally hazardous liquids are spilled on water or land, or both, a containment boom is disposed around the spill area to minimize damage to the surrounding environment. Containment booms may also be used to prevent water from entering sensitive areas during flooding or to control erosion. Known booms are typically provided in relatively large lengths of over 50 feet.

Although longer length booms are effective in containing large material spills, they are inefficient in containing smaller spills due to their inability to maintain sealing contact with shore areas or support surfaces if bent. It has also been found that due to their long length and heavy weight, longer booms are difficult to handle and connect with other booms. Current booms are difficult to interconnect to one another because their end portions tend to obliquely incline in a direction away from the interconnecting boom. It will be appreciated that this causes several problems. First, interconnection of these booms is difficult and wastes precious time in trying to contain the spill to a small area. Secondly, once a connection between the booms is made, a gap or opening is created between the boom and the supporting surface, thereby allowing spilled material to escape the containment area. Finally, the inclined connection between the two booms creates large torsional stresses at the end of the boom which may later lead to tearing or destruction of the boom and release of the contained materials.

Based upon the foregoing, it is evident that there is a need in the art for a shore seal tidal barrier containment boom that is easily interconnectable with other booms and provides containment of material at the connection therebetween and between the booms and their supporting surface. Furthermore, there is also a need in the art for a shore seal tidal barrier containment boom that is easily handled and that can be quickly connected to other lengths of boom.

DISCLOSURE OF INVENTION

In light of the foregoing, it is a first aspect of the present invention to provide a shore seal tidal barrier containment boom.

Another aspect of the present invention is to provide a containment boom that minimizes leaks at connections with other containment booms.

Still a further aspect of the present invention, as set forth above, is to provide a containment boom that is easily interconnected to like containment booms.

Yet an additional aspect of the present invention, as set forth above, is to provide a containment boom which has a buoyancy chamber that is carried or supported by a ballast chamber wherein the ballast chamber comprises two compartments that support the buoyancy chamber therebetween.

A further aspect of the present invention, as set forth above, is to provide a containment boom made of rubberized fabric layers which are interconnected to one another.

Another aspect of the present invention, as set forth above, is to provide a containment boom which has end connector bars affixed to each end of the buoyancy chamber and the ballast chamber.

Yet another aspect of the present invention, as set forth above, is to provide the ballast chamber with a flat bottom surface which has a tapered bottom surface connected to the end connector bar.

Still another aspect of the present invention, as set forth above, is provided by virtue of the tapered bottom surface which maintains the end connector bar in a substantially perpendicular relationship with the buoyancy and ballast chambers expanded, thereby facilitating containment of spilled materials and connection with other containment booms.

Another aspect of the present invention, as set forth above, is provided by virtue of the tapered bottom surface which allows for short length containment booms to be connected to one another, the shorter lengths being easier to handle and arrange around spilled material than longer length containment booms.

Still yet another aspect of the present invention, as set forth above, is to provide a plurality of handles extending upwardly from the buoyancy chamber to facilitate transport of the containment boom.

Still yet a further aspect of the present invention, as set forth above, is to provide respective fill fittings in the buoyancy chamber and the ballast chamber to allow for expansion of the same when deploying the containment boom.

Still yet an additional aspect of the present invention, as set forth above, is to provide a plurality of cross-flow holes between the compartments of the ballast chamber.

The foregoing and other aspect of the invention, which shall become apparent as the detailed description proceeds, are achieved by a shore seal boom, comprising: a buoyancy chamber; a ballast chamber having at least one tapered surface; and an end connector bar connecting at least one end of the buoyancy chamber to a respective end of the ballast chamber, the at least one tapered surface extending from the end connector bar to maintain the end connector bar in a substantially perpendicular relationship with the buoyancy chamber and the ballast chamber when expanded.

The present invention also provides an interconnectable shore seal boom which contains material without leakage at connected ends of the boom, comprising: a first chamber; a second chamber; and at least one end member connecting respective ends of the first and second chambers and remaining substantially perpendicular when the first and second chambers are expanded.

The present invention also provides a shore seal boom, comprising: a buoyancy chamber having opposed buoyancy layers secured to one another; a ballast chamber having a pair of ballast compartments formed by a pair of side ballast layers secured to respective buoyancy layers and a pair of compartment layers connected at one edge to respective side ballast layers and at another edge to each other; and a pair of end bars connecting each end of the buoyancy chamber to a respective end of the ballast chamber, wherein at least the compartment layers form a bottom surface from which obliquely extends at each end thereof a tapered surface connected to respective end bars.

BRIEF DESCRIPTION OF THE DRAWINGS

For a complete understanding of the objects, techniques and structure of the invention, reference should be made to the following detailed description and the accompanying drawings wherein.

BEST MODE FOR CARRYING OUT THE INVENTION

Figure 1:
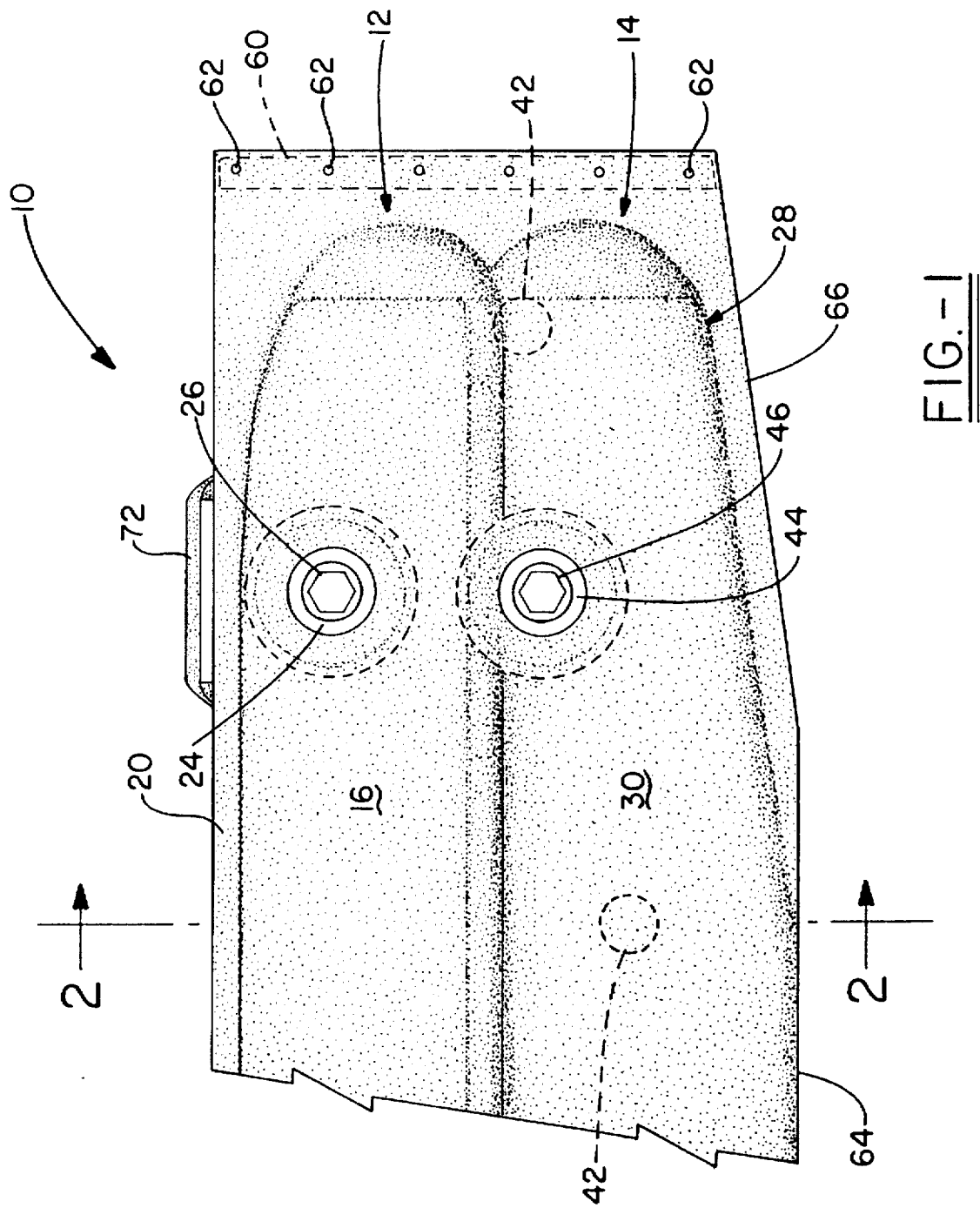
FIG. 1 is a partial elevational view of one end of a shore seal barrier containment boom in an unexpanded condition according to the present invention, the opposite end being of similar construction.

Referring now to the drawings it can be seen that a shore seal tidal containment boom, according to the present invention is designated generally by the numeral 10. Generally, the boom 10 includes a buoyancy chamber 12, which receives air or other lighter than air gas, and a ballast chamber 14 which receives water or other buoyancy neutral material to stabilize the position of the boom 10 when expanded. It will be appreciated that the ballast chamber 14 supports or carries the buoyancy chamber 12 in a triangular configuration. The ballast chamber 14 rests on a sea bed or shore until such time that the flotation force of the buoyancy chamber 12 overcomes the effects of the ballast chamber when the boom 10 is placed in a body of water. It will be appreciated that the triangular configuration facilitates the stabilization of the boom 10 and the movement or transport thereof. When the boom 10 is placed in a body of water, the structure of the ballast chamber 14 is such that the buoyancy chamber 12 is self-positioning to the top thereof. As the boom 10 is transitioned from a body of water to shore, the orientation of the boom with the ballast chamber 14 positioned underneath the buoyancy chamber 12 remains the same. This feature allows the boom 10 to adjust to changing tides while still containing spilled material. It will further be appreciated that the buoyancy chamber 12 and ballast chamber 14 are made of rubberized fabric materials that are impervious to water and other chemical agents that might otherwise destroy the fabric material. The rubberized fabric also assists in maintaining a seal between the shore, which may be sand, concrete or other construction material, thus preventing the leakage of water or other hazardous material underneath the ballast chamber 14.

The buoyancy chamber 12 includes a pair of opposed buoyancy layers 16 which are sealed to one another along their respective edges by a crotch or tension tape 18. Those skilled in the art will appreciate that the buoyancy layers 16 and tension tape 18 are unvulcanized rubber impregnated fabric initially bonded to one another by any well known compatible adhesive material. Upon securing the fabric layers and tape to one another the unvulcanized material is then vulcanized which transforms the layers and tension tape into one homogeneous structure. As used herein, the term "layer" signifies a longitudinally extending length of material. During the vulcanization process the layers are horizontally positioned and secured to one another in a manner well known in the art. Upon completion of the manufacturing process the layers are oriented vertically for use as will be described later. The tension tape 18 may overlap at its respective ends where needed. Those skilled in the art will also appreciate that the tension tape 18 functions to support the buoyancy layers 16 and prevents them from peeling apart when exposed to any type of pulling or lateral strain/ stress. The bonding of the buoyancy layers 16 form an exposed flange 20 and a hidden flange 22 which extends into the ballast chamber 14. The homogenous structure created by the vulcanization process creates an airtight seal within the buoyancy chamber 12. A buoyancy fill fitting 24 is disposed in one of the buoyancy layers 16 for receipt of air in the buoyancy chamber 12. The fill fitting 24 is positioned in an upwardly directed angle to minimize exposure to materials that might inadvertently enter the buoyancy chamber 12. A cap 26 may be provided to seal the buoyancy fitting 24. Of course, other means may be employed to facilitate entry of air into the buoyancy chamber 12. It will be appreciated that additional fill fittings 24 may be disposed at the other end of the buoyancy chamber 12 or in the other buoyancy layer 16.

The ballast chamber 14 includes a pair of ballast compartments 28 which support the buoyancy chamber 12 thereabove. A pair of ballast layers 30 connect to respective sides of the buoyancy chamber 12. A tension or crotch tape 32 is employed to interconnect the buoyancy layers 16 to the ballast layers 30. The tension tape 32 also interconnects the ballast layers 30 to a pair of respective compartment layers 34 at one edge thereof wherein the opposite edges of the respective compartment layers 34 are secured to one another. A ballast flange 36 extends outwardly from each connection between the ballast layer 30 and the compartment layer 34. A crotch or tension tape 38 is employed to interconnect the compartment layers 34 to one another and to prevent their separation during use. An internal support layer 40 is provided in each of the ballast compartments 28 and is connected to the interior surface of each respective compartment layer 34. In a similar manner, an internal support layer 41 is also provided in each of the ballast compartments 28 and is bonded to the overlap of the buoyancy layers 16, which extend into the ballast chamber 14, and the respective compartment layer 34. A plurality of cross-flow holes 42 are provided between the ballast compartments 28. In particular, the cross-flow holes 42 are provided in staggered positions with one plurality of cross-flow holes 42 provided through the internal support layers 40 and the compartment layers 34, while a second plurality of the cross-flow holes 42 are provided through the internal support layers 41, and the hidden flange 22. It will be appreciated that the cross-flow holes 42 allow for the transfer of ballast material, such as water, between the adjacent ballast compartments 28 to evenly maintain the ballast chamber 14 upon any surface which it may contact. A ballast fill fitting 44 is disposed in one of the ballast layers 30 for receipt of ballast material. The fill fitting 44 is positioned in an upwardly directed angle to minimize exposure to materials that might inadvertently enter the ballast chamber and to keep the ballast material in. A cap 46 may be provided to seal the ballast chamber 14. Other means may be employed to facilitate entry of ballast material into the ballast chamber 14. Additional fill fittings 44 may be disposed at the other end of the ballast chamber 14 or in the other ballast layer 30.

Figure 2:
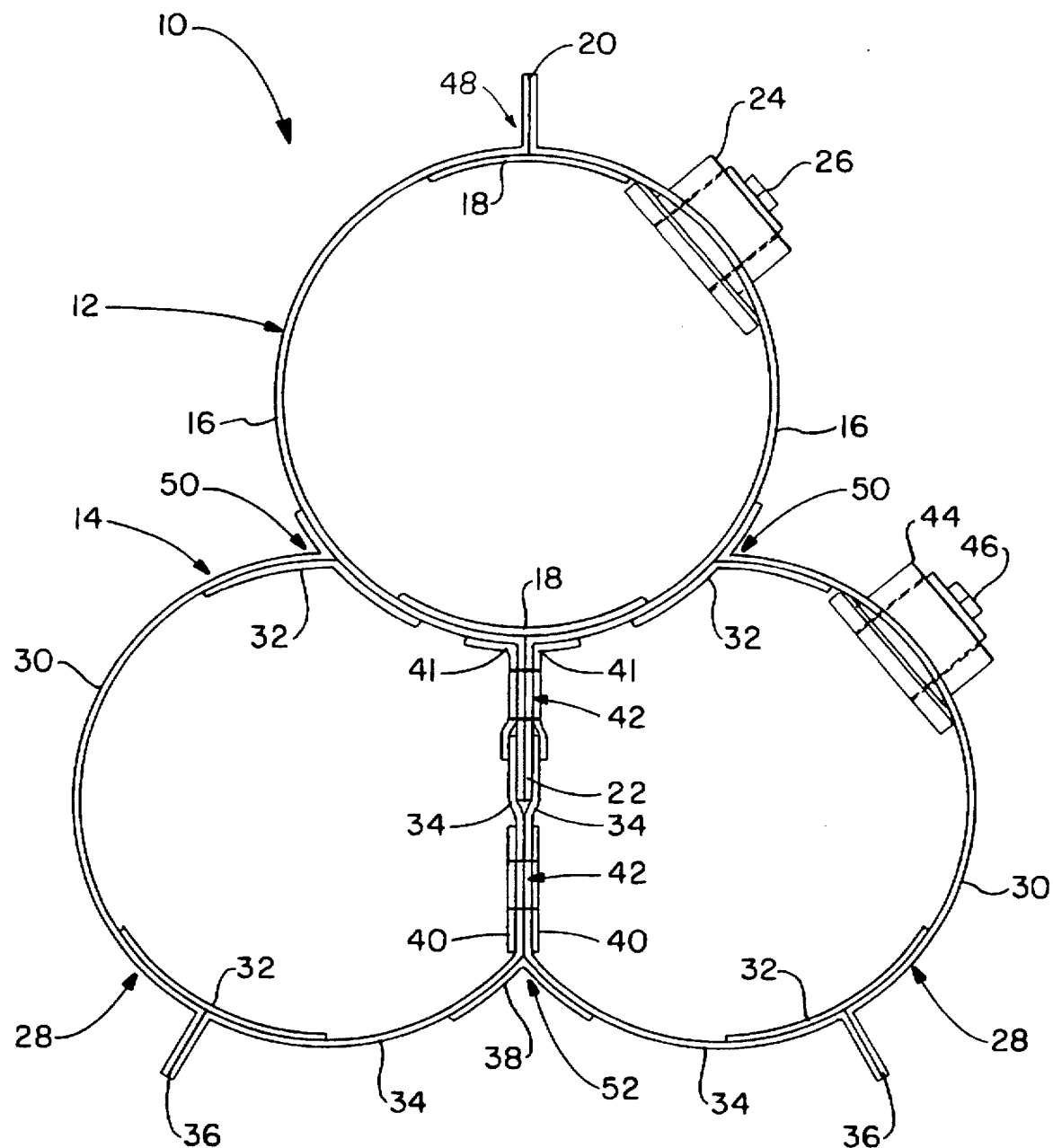
FIG. 2 is a transverse sectional view as may be taken at line 2—2 of FIG. 1 of the shore seal barrier containment boom in an expanded condition.

As best seen in FIG. 2, the tension tape 18 and the buoyancy layers 16 form a buoyancy seam 48 which extends the entire length of the buoyancy chamber 12. In a similar manner, the pair of tension tapes 32, the buoyancy layers 16 and the compartment layers 30 form corresponding ballast seams 50 which extend the entire length of respective ballast compartments 28. Finally, the tension tape 38 and the compartment layers 34 form a compartment seam 52 in between the ballast compartments 28.

An end connector bar 60 terminates the respective ends of the buoyancy chamber 12 and the ballast chamber 14 to one another. In the preferred embodiment, the end connector bar 60 is provided within the buoyancy layers 16, the ballast layers 30 and the compartment layers 34. The end connector bar 60 is maintained in a substantially orthogonal relationship with respect to the buoyancy chamber 12 and the ballast chamber 14. The end connector bar 16 may be provided with a plurality of bar holes 62 which facilitate the connection of the booms 10 to other like booms or to other devices which may interconnect the booms to one another.

The ballast chamber 14 includes a bottom surface 64 from which extends a tapered bottom surface 66 that is terminated at the end connector bar 60. In other words, the tapered bottom surface 66 extends obliquely from the bottom of the end connector bar 60 to the bottom surface 64 in such a manner that when the buoyancy chamber 12 and the ballast chamber 14 are expanded, the end connector bar 60 remains in a substantially perpendicular relationship thereto. The tapered bottom surface 66 is formed by angularly modifying the compartment layers 34, the ballast layers 30 and the tension tape 32 at each end of the boom 10. The amount of the angular modification is dependent upon at least the width and height of the boom 10. Moreover, the tapered bottom surface 66 maintains the end connector bar 60 in a perpendicular relationship with the support surface upon which it is disposed when the containment boom 10 is expanded. Of course, the length of the tapered bottom surface 66 may vary with dimensional changes in other components of the containment boom. In any event, the length of the tapered bottom surface 66 will be selected to maintain the end connector bar 60 in an upright perpendicular position when the containment boom 10 is expanded. Those skilled in the art will appreciate that without the tapered bottom surface 66, expansion of the containment boom 10 would cause the end connector bar 60 to deflect inwardly toward the center of the boom. This would make the connection to other booms very difficult. Additionally, forcing this type of connection would result in an undesirable gap underneath the boom and create destructive torsional forces between the end connector bar and the layers connected thereto.

A plurality of handles 72 may extend upwardly from the buoyancy chamber 12 to facilitate the transport and movement of the shore seal boom 10 in both its expanded and unexpanded conditions. The handles may be made of the same rubberized fabric material used for the layers 16, 30 and 34 or they may be made of other material that is riveted or secured to the containment boom 10 in a manner well known in the art.

Figure 3:
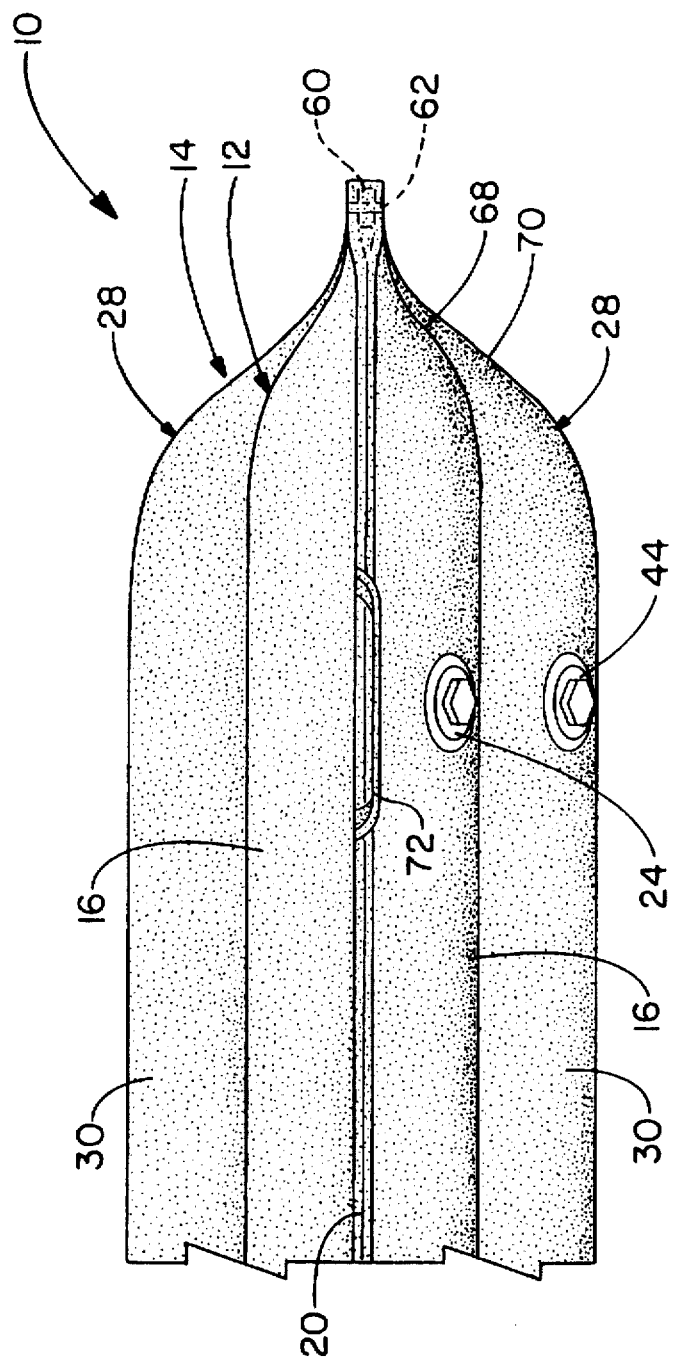
FIG. 3 is a top view of one end of the shore seal barrier containment boom in an expanded condition.

As best seen in FIG. 3, the sides of the end of the boom 10 are also angularly directed inward to the end connector bar 60. In particular, the buoyancy layers 16 provide a buoyancy side taper surface 68 that extends obliquely from the end connector bar 60. In a similar manner, the ballast layers 30 provide a ballast side taper surface 70 that extends obliquely from the end connector bar 60. These side taper surfaces 68 and 70 provide a structural transition from their respective chambers to the end of the boom 10.

In use the containment boom 10 is stored in a relatively flattened configuration and is transported to the appropriate area when needed. The ballast chamber 14 is filled with an appropriate ballast material through the fill fittings 44 and in a similar manner buoyancy material is inserted into the buoyancy chamber 12 through the fill fittings 24 to expand the containment boom 10 as best seen in FIG. 2. When the chambers 12 and 14 are expanded, the tapered bottom surface 66 allows the end connector bar 60 to remain in a substantially perpendicular position with respect to whatever surface is supporting the boom 10. Moreover, the end connector bar 60 is placed in a bearing relationship with the support surface, such as a beach, shore or the like. As such, the entire bottom surface of the containment boom 10 maintains sealing contact with a support surface until the boom is placed in a sufficient depth of water for the flotation forces of the boom to overcome the ballast forces of the boom.

From the above description of the structure and use of the boom 10 several advantages thereof are readily apparent. The primary advantage of the present invention is that by maintaining the end connector bar 60 in a substantially perpendicular relationship it is easily secured to other like booms 10 or other attachment fixtures. Another advantage is that tapered bottom surfaces 66 maintains the bottom surface of the boom in sealing contact with a support surface thereby preventing any harmful materials from escaping underneath the containment boom. Still another advantage of the present invention is that by maintaining the fabric layers in their naturally oriented position the resulting torsional stresses when the booms are connected is minimized.

Thus, it can be seen that the objects of the invention have been satisfied by the structure presented above. It should be apparent to those skilled in the art that the objects of the present invention could be practiced with any size of buoyancy chamber and ballast chamber.

While the preferred embodiment of the invention has been presented and described in detail, it will be understood that the invention is not limited thereto or thereby. As such, various materials and configurations may be used in the construction of the invention to meet the various need of the consumer. Accordingly, for an appreciation of the true scope and breadth of the invention, reference should be made to the following claims.

What is claimed is:

1. A shore seal boom, comprising:

a buoyancy chamber;

a ballast chamber having a bottom surface opposite said buoyancy chamber and at least one tapered surface extending from said bottom surface; and an end connector bar connecting at least one end of said buoyancy chamber to a respective end of said ballast chamber, said at least one tapered surface extending from said end connector bar to said bottom surface to maintain said end connector bar in a substantially perpendicular relationship with said buoyancy chamber and said ballast chamber when expanded.

2. The shore seal boom according to claim 1, wherein said ballast chamber comprises a pair of ballast compartments carrying said buoyancy chamber, each of said ballast compartments having a tapered bottom surface which extends from said end connector.

3. The shore seal boom according to claim 2, wherein said ballast compartments have cross-flow holes therebetween and wherein at least one said ballast compartment has a sealable fill fitting.

4. The shore seal boom according to claim 2, wherein said buoyancy chamber has a plurality of handles extending therefrom and at least one sealable fill fitting.

5. The shore seal boom according to claim 2, wherein said buoyancy chamber and said ballast chamber are made from rubberized fabric.

6. An interconnectable shore seal boom which contains material without leakage at connected ends of the boom, comprising:

a first chamber;

a second chamber having a pair of ballast compartments; and at least one end member connecting respective ends of said first and second chambers and remaining substantially perpendicular when said first chamber and said pair of ballast compartments are expanded.

7. The boom according to claim 6 wherein one of said first and second chambers has a tapered edge extending from said at least one end member.

8. The boom according to claim 7, wherein said first chamber is expanded and rests upon said second chamber which comprises a pair of compartments having cross-flow holes therebetween, said second chamber having said tapered edge.

9. The boom according to claim 8 further comprising a plurality of handles extending from said first chamber in a direction substantially opposite said second chamber.

10. The boom according to claim 9 wherein said first and second chambers have respective fill fittings extending therefrom.

11. The boom according to claim 7 wherein said at least one end member is attachable to a like end member to form a continuous length of boom, each attached said end member having said tapered edge to prevent escapement of the enclosed material at the interconnected ends.

12. A shore seal boom, comprising:

a buoyancy chamber having opposed buoyancy layers secured to one another;

a ballast chamber having a pair of ballast compartments formed by a pair of side ballast layers secured to respective said buoyancy layers and a pair of compartment layers connected at one edge to respective said side ballast layers and at another edge to each other; and a pair of end bars connecting each end of said buoyancy chamber to a respective end of said ballast chamber, wherein at least said compartment layers form a bottom surface from which obliquely extends at each end thereof a tapered surface connected to respective said end bars.

13. The shore seal boom according to claim 12, wherein said buoyancy layers have a buoyancy side taper surface at each end thereof and said ballast layers have a ballast side taper surface and wherein said buoyancy side taper surfaces and said ballast layer taper surfaces terminate at said end bars.

14. The shore seal boom according to claim 12, wherein said end bars have holes therethrough to facilitate attachment to other end bars.

15. The shore seal boom according to claim 12, further comprising tension members interconnecting said buoyancy layers to one another, said buoyancy layers to respective said ballast layers, and said ballast layers to said compartment layers.

* * * * *